US005791517A

United States Patent [19]

Avital

[11] Patent Number: 5,791,517

[45] Date of Patent: Aug. 11, 1998

[54] BEVERAGE DISPENSER DEVICE

[75] Inventor: Ami Avital, Tel Aviv, Israel

[73] Assignee: Menachem M. Deren, Lod, Israel

[21] Appl. No.: 604,446

[22] Filed: Feb. 21, 1996

[51] Int. Cl.[6] .......... G01F 11/00

[52] U.S. Cl. .......... 222/1; 222/129; 222/185.1; 222/481.5; 222/518

[58] Field of Search .......... 222/1, 129, 146.6, 222/185.1, 481.5, 518, 556

[56] References Cited

U.S. PATENT DOCUMENTS

| | | | |
|---|---|---|---|
| 2,689,669 | 9/1954 | Ericson | 222/185.1 X |
| 4,722,463 | 2/1988 | Anderson | 222/185.1 |
| 4,844,290 | 7/1989 | McCurdy et al. | 222/185.1 |
| 5,232,110 | 8/1993 | Purnell | 222/481.5 X |
| 5,335,829 | 8/1994 | Sovann | 222/185.1 X |
| 5,405,058 | 4/1995 | Kalis et al. | 222/481.5 X |
| 5,509,583 | 4/1996 | Dolson | 222/185.1 |
| 5,597,093 | 1/1997 | Lee | 222/146.6 X |

*Primary Examiner*—Joseph Kaufman
*Attorney, Agent, or Firm*—Edward Langer, Pat. Atty.

[57] ABSTRACT

A refrigerator door-mounted beverage dispenser device for use with bottled beverages, to control beverage flow during dispensing from a bottle. The device comprises a generally cylindrical housing engaging the mouth of the bottle, an operating lever pivotably attached to the housing and movable between upper and lower positions, a self-closing flow valve, and a valve actuator operable with the operating lever to open the flow valve by applying pressure thereto while it is in either of the upper and lower positions, to enable controlled beverage flow. In a preferred embodiment, the beverage dispenser device itself is threaded onto the beverage bottle, sealing it closed. A retractable lever is arranged to displace a ball valve and enable liquid beverage flow into a cup. When combined with a bottle holder mounted on a refrigerator door, the bottle is inverted and the beverage dispenser device becomes a self-service bar providing a door-mounted beverage dispensing system, offering quick and easy access without opening the door. The advantage of the inventive design over conventional beverage dispensers is a significant savings in electrical energy, since the refrigerator door need not be opened, and escape of cool air from the refrigerator is prevented. Many other configurations of the beverage dispenser are possible, such as with an ice container and a table-top dispenser.

17 Claims, 9 Drawing Sheets

FIG.8A
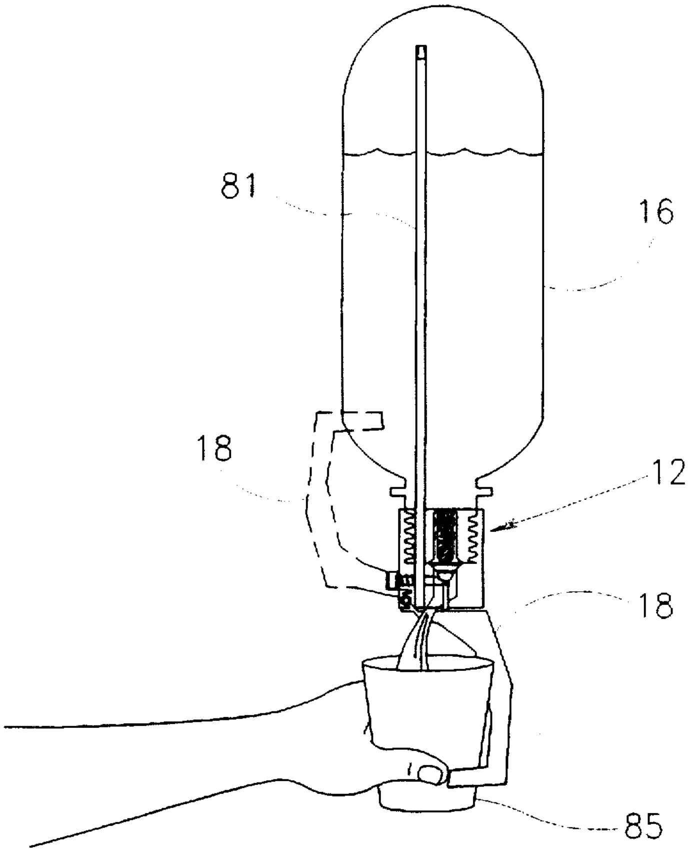
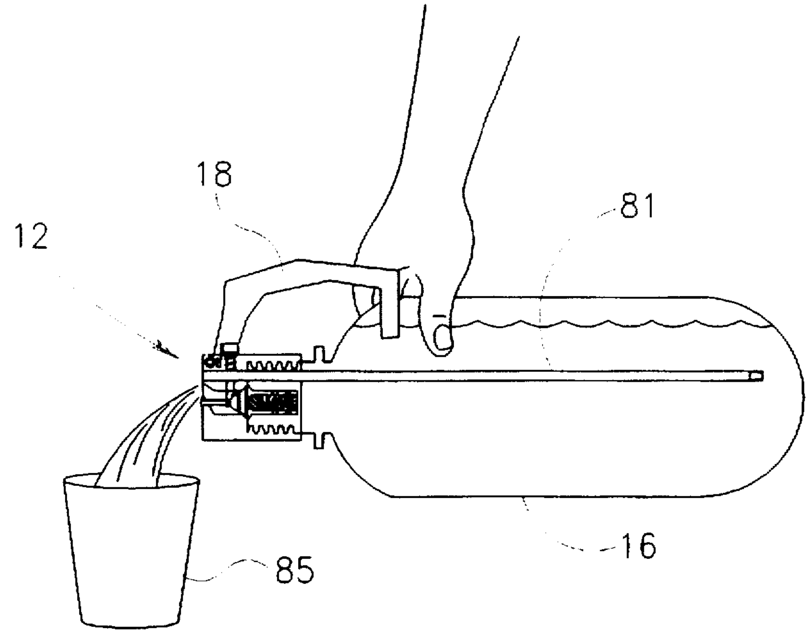
FIG.8B

BEVERAGE DISPENSER DEVICE

FIELD OF THE INVENTION

The present invention relates to soda valves and beverage dispensers and the like, and more particularly, to a door-mounted beverage dispenser for a refrigerator, which can also be used as a portable beverage dispenser for table mounting.

BACKGROUND OF THE INVENTION

The prior art of beverage dispensers includes a refrigerator door-mounted valve for supplying drinking water. The typical design provides this valve on the outside of the door, for extra convenience in providing tap water for drinking needs. A plumbing connection is provided for the tap water supply to the refrigerator, and the water is cooled for drinking purposes. This design is popular in many US-manufactured refrigerator models.

Despite the convenience provided by the refrigerator door-mounted water valve designs, soft drinks and other beverages do not use this dispenser type, and are typically provided in bottled form, with the bottles stored in a refrigerator door rack.

It would therefore be desirable to provide a door-mounted beverage dispenser device for use with bottled beverages.

SUMMARY OF THE INVENTION

Accordingly, it is a principal object of the present invention to overcome the limitations of existing refrigerator door-mounted water valve designs, and provide a door-mounted beverage dispenser device for use with bottled beverages.

In accordance with a preferred embodiment of the present invention, there is provided a beverage dispenser device for controlling dual-made beverage flow during dispensing from a bottle, said device comprising:

- a generally cylindrical housing having a borehole formed therethrough, and having means for engaging the mouth of the bottle;
- an operating lever pivotably attached to said housing and movable between upper and lower positions;
- a self-closing flow valve seated at an end of said borehole, for controlling beverage flow therethrough; and
- a valve actuator means in said housing being operable with said operating lever to open said flow valve by applying pressure to said operating lever while it is in either of said upper and lower positions, to enable controlled beverage flow.

In a preferred embodiment, the inventive beverage dispenser device holds the bottle in an inverted position in a refrigerator door-mounted beverage dispensing system, to enable beverage dispensing external to the refrigerator without opening the door, for quick and effortless beverage dispensing.

The beverage dispenser device itself is threaded onto the beverage bottle, sealing it closed. A retractable lever is arranged to displace a ball valve and enable liquid beverage flow into a cup. When combined with a bottle holder mounted on a refrigerator door, the beverage dispenser device becomes a self-service bar providing a door-mounted beverage dispensing system, offering quick and easy access to all, without opening the door.

An advantage of the present invention over conventional beverage dispensers is a significant savings in electrical energy, since the refrigerator door need not be opened, and escape of cool air from the refrigerator is prevented.

Another advantage of the invention is that the bottle remains sealed and airtight until its contents are emptied.

Many other configurations of the beverage dispenser are possible, such as with an ice container and a table top dispenser.

Other features and advantages of the invention will become apparent from the following drawings and description.

BRIEF DESCRIPTION OF THE DRAWINGS

For a better understanding of the present invention with regard to the embodiments thereof, reference is made to the accompanying drawings, in which like numerals designate corresponding elements or sections throughout, and in which:

FIGS. **1*a*–*b*** are perspective views of a refrigerator containing a door-mounted beverage dispenser device constructed in accordance with the principles of the present invention;

Figure 5:
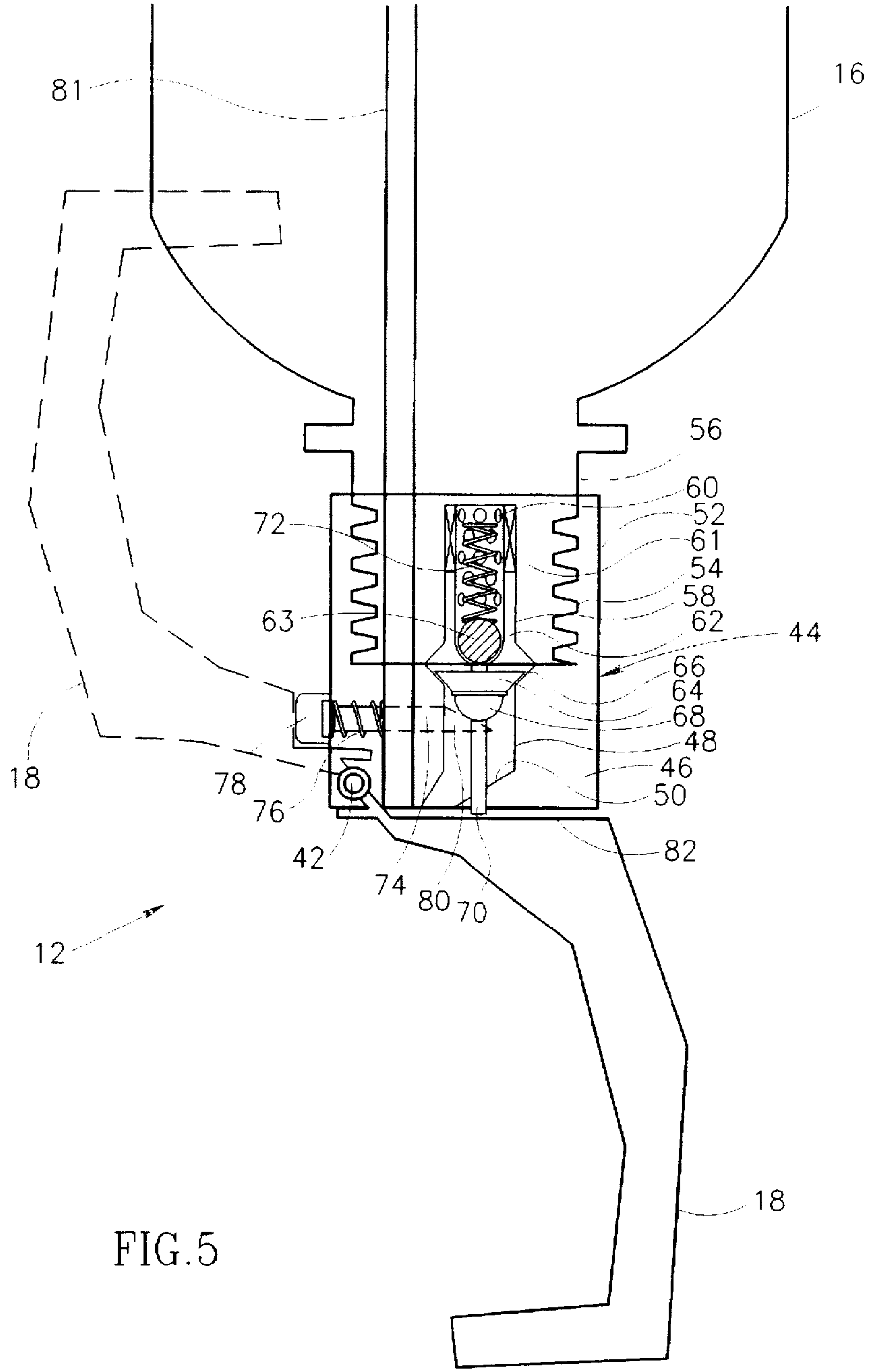
Figure 7:
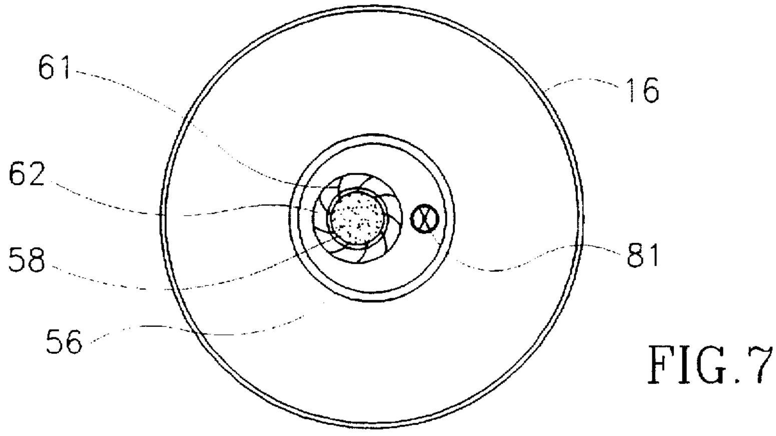

FIGS. **2*a*–*b*** illustrate an alternative refrigerator layout featuring the inventive beverage dispenser device;

FIGS. **3*a*–*b*** illustrate the inventive beverage device configured for use in an ice container for placement on a table;

FIGS. **4*a*–*b*** illustrate an alternative layout of the beverage dispenser device, configured as a table top dispenser;

FIG. 5 is a detail view of the inventive beverage dispenser device showing the beverage flow path; and FIGS. **6*a*–*b*** are side views of the inventive dispenser device mounted on a beverage bottle;

FIG. 7 is a cross-sectional top view of the beverage bottle interior, showing the inventive beverage dispenser device;

FIG. **8*a*–*b*** illustrate the dispenser device in use.

DETAILED DESCRIPTION OF THE PREFERRED EMBODIMENTS

Referring now to FIGS. **1*a*–*b* and 2*a*–*b*, there are shown perspective views of a refrigerator 10 provided with a door-mounted beverage dispenser device 12 constructed in accordance with the principles of the present invention. Refrigerator door 14 is provided in a side-by-side design, and is constructed with device 12 mounted in its upper portion. Device 12 comprises a bottle closure (not shown) which is mounted on each of a plurality of inverted beverage bottles 16, with each device 12 arranged to enable dispensing of a beverage by applying slight pressure to a lever 18. A viewing window 20 in door 14 provides a visual indication of the liquid level in each of bottles 16. When empty, each of bottles 16 can be removed from door 14** and replaced after the bottle closure is mounted on it.

Figure 1A:
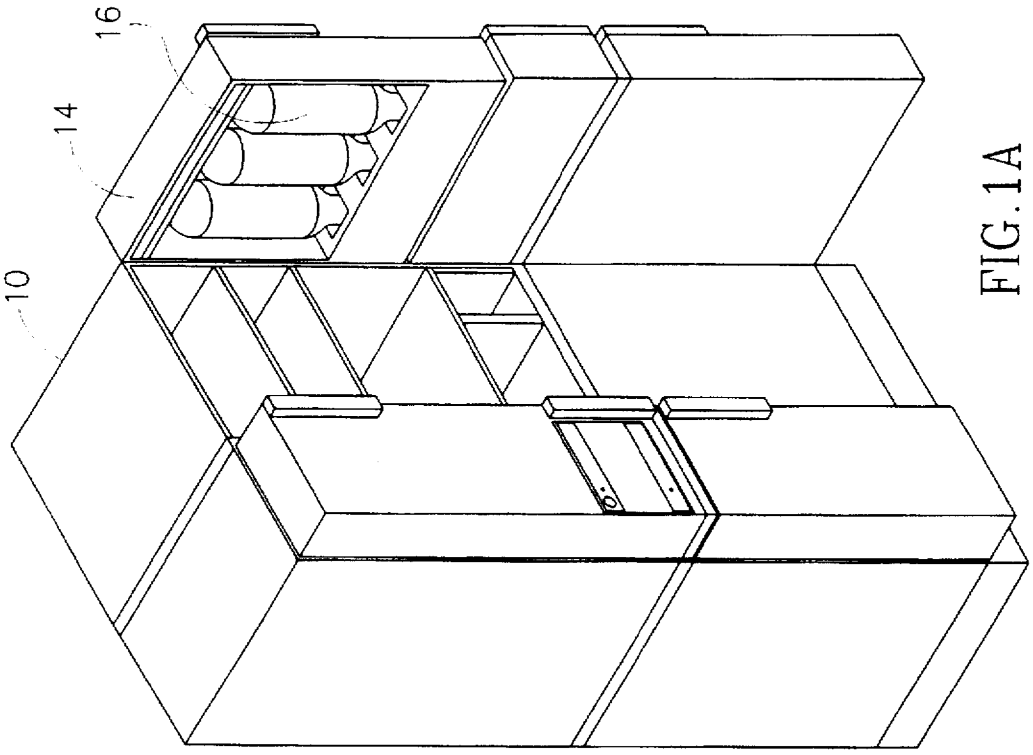
Figure 1B:
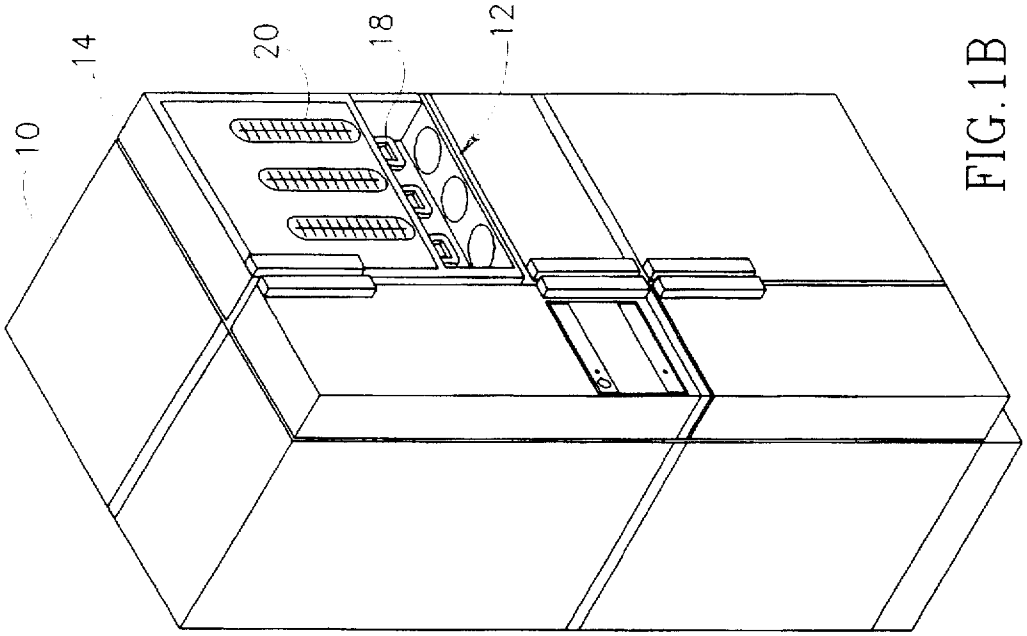
Figure 2B:
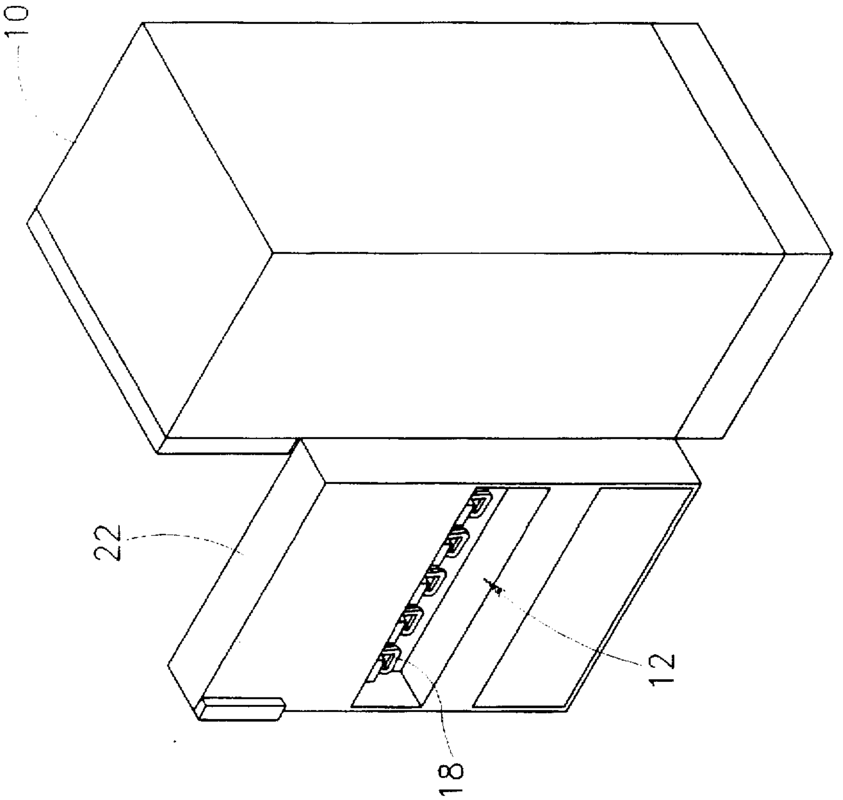
Figure 2A:
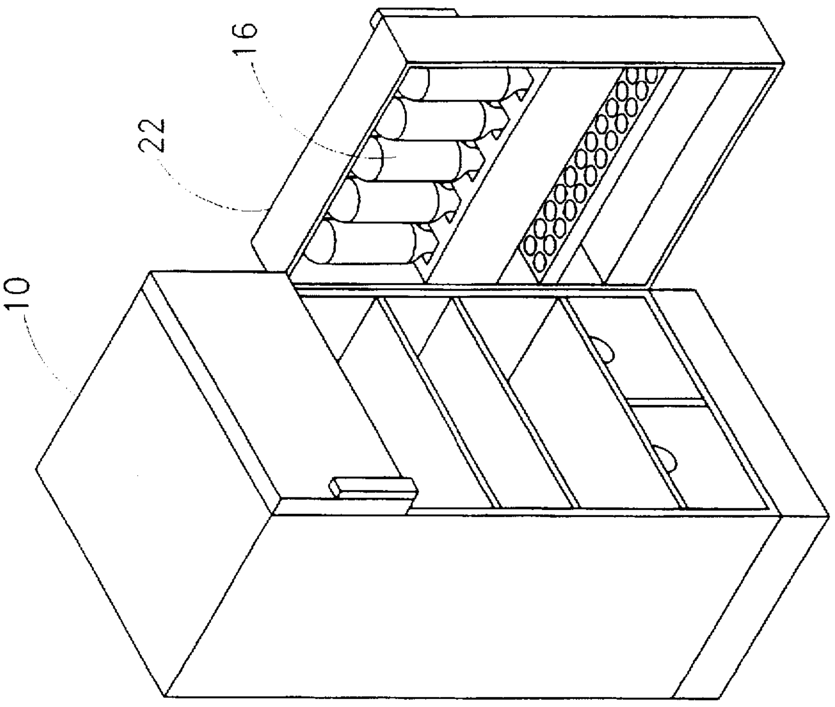

FIGS. **2*a*–*b* illustrate an alternative refrigerator layout featuring the inventive beverage dispenser device 12 mounted on door 22. Unlike the narrow door 14 of the side-by-side design shown in FIGS. 1*a*–*b*, the full width of door 22 is utilized to accommodate five beverage bottles 16**, in a similar arrangement.

In FIGS. **3*a*–*b*, the inventive beverage dispenser device 12 is illustrated in a configuration featuring an ice container 24, which can be used for outdoor camping and picnic activities. A large compartment 26 can be used to store ice and packaged foodstuffs, and a plurality of bottles 16 are arranged in an adjacent beverage compartment 28, each bottle having beverage dispenser device 12. A removable cover plate 30 is mounted over compartment 28 containing beverage bottles 16. The base 32 of ice container 24 is integrally formed with circular cup supports 34**.

Figure 3A:
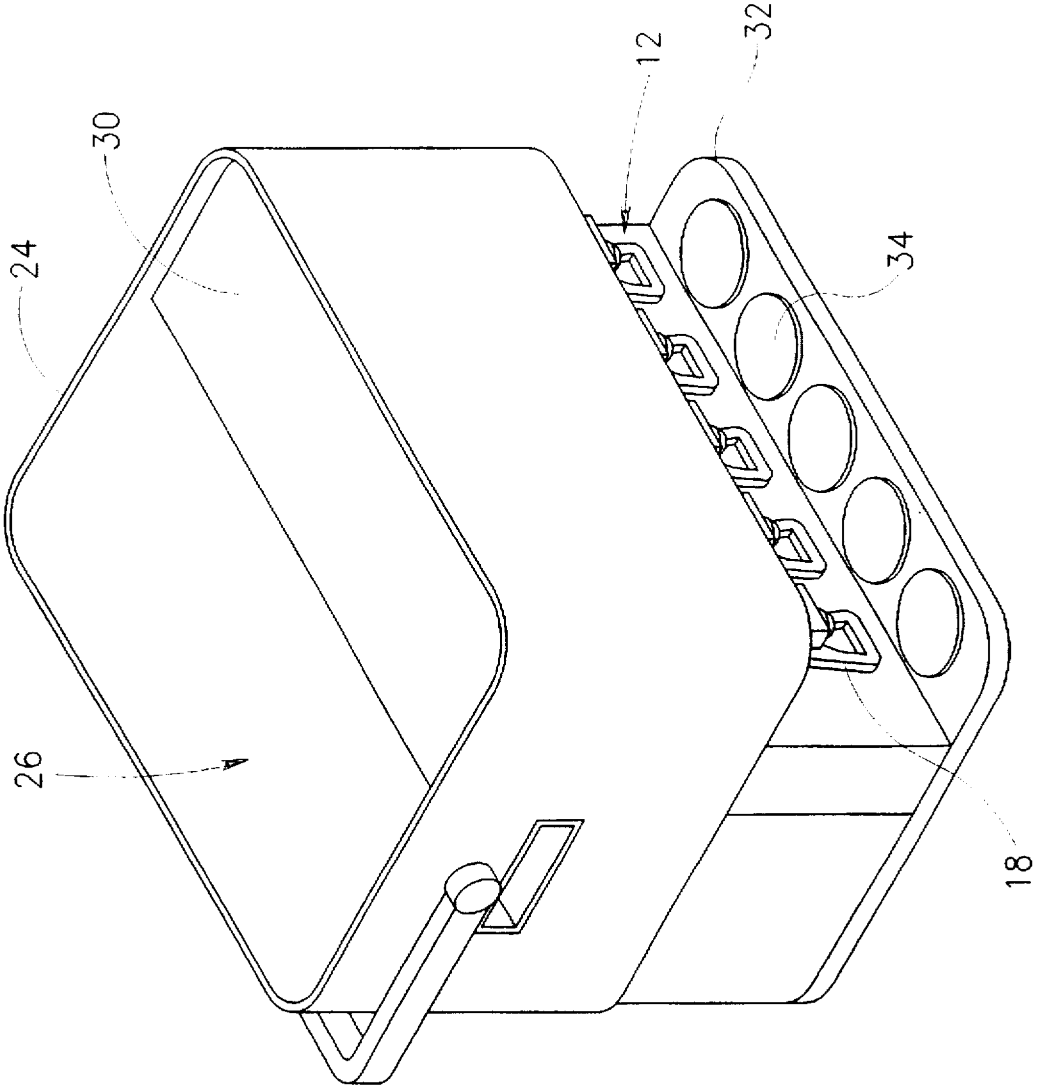
Figure 3B:
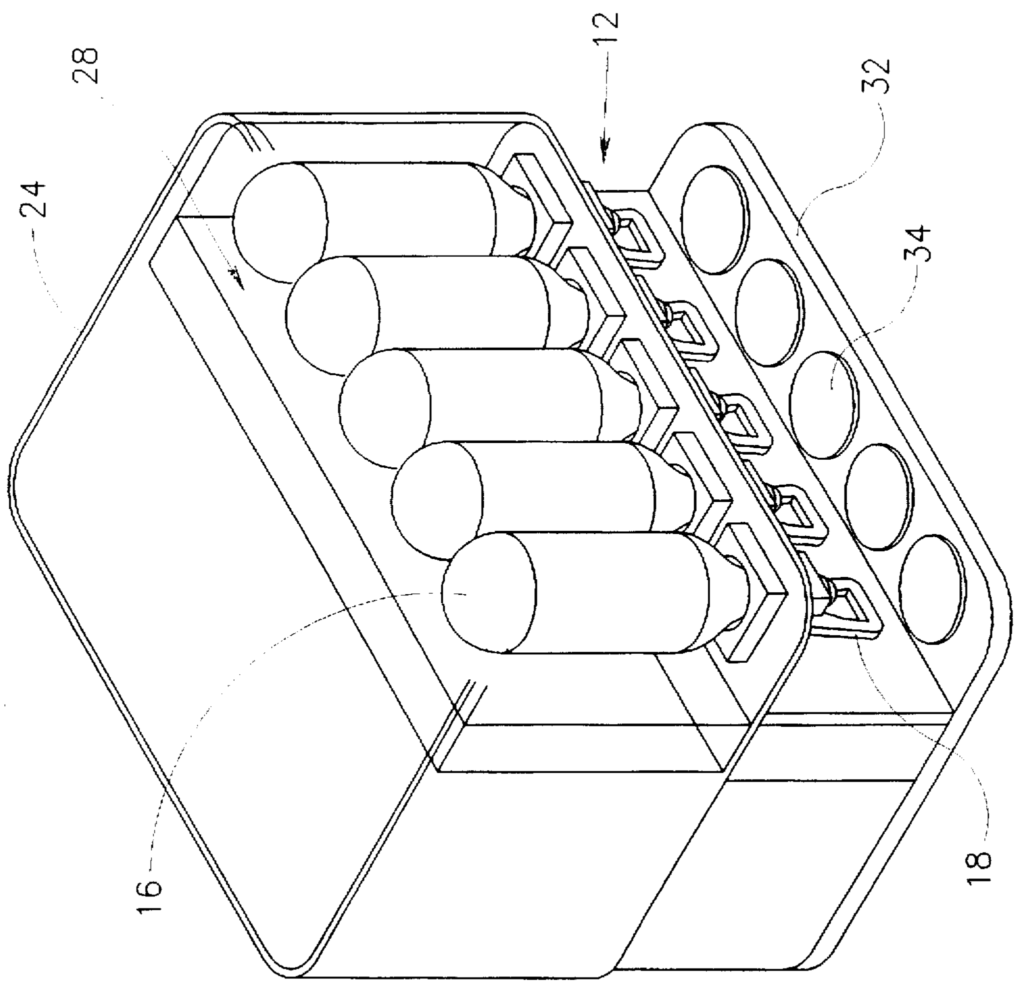
Figure 4B:
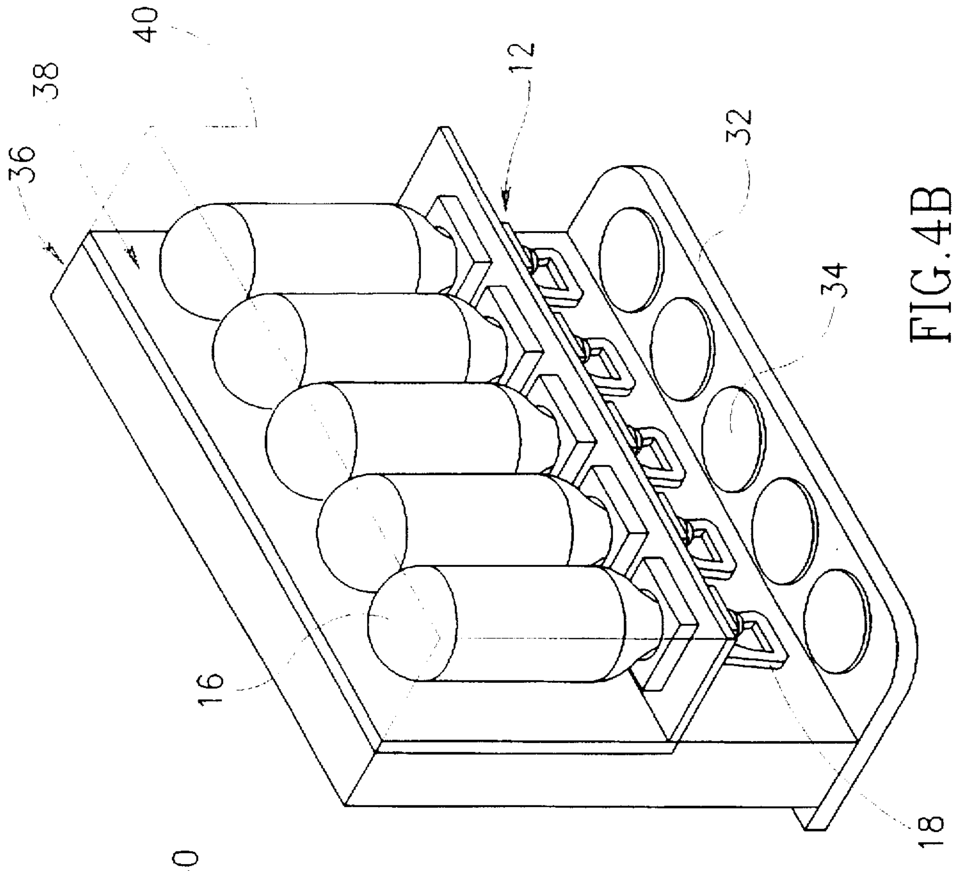
Figure 4A:
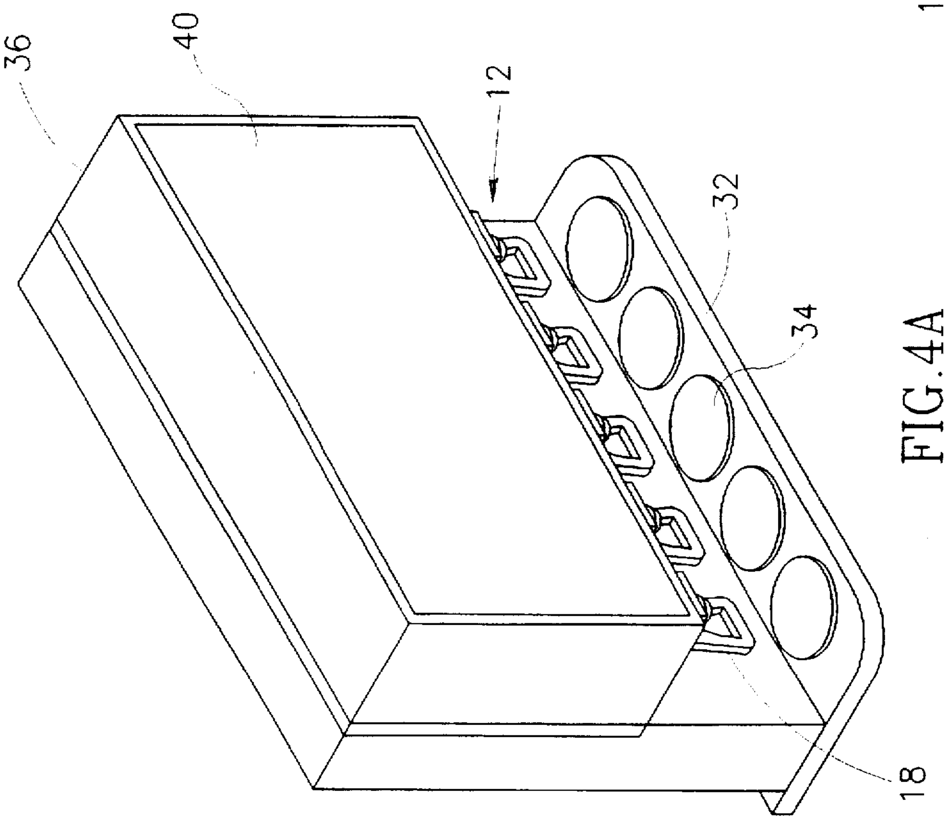

In FIGS. 4a–b, the inventive beverage dispenser device 12 is illustrated in a configuration featuring a table-top beverage dispenser 36, which is convenient for outdoor camping and picnic activities. A plurality of bottles 16 are arranged in a front compartment 38, which has a removable cover 40. The base 32 of dispenser 36 has circular cup supports 34, as in FIGS. 3a–b.

In FIG. 5, there is shown a side view of the inventive dispenser device 12 mounted on a bottle 16 which is shown in inverted orientation. Handle 18 is mounted to device 12 by a lug 42, such that it is pivotable into upper and lower positions. Device 12 comprises a housing 44 having a solid portion 46 formed with a borehole 48 and a tapered channel 50, forming a flow passage therethrough for exit of the beverage through dispenser device 12. A hollow portion 52 of housing 44 is formed with threads 54 which engage threads formed in neck 56 of bottle 16.

Extending from the solid portion 46 of housing 44 into neck 56 of bottle 16 is a flow port 58, formed with holes 60, and spiral flow vanes 61 in a sleeve 62 formed around port 58. A ball-check flow control valve 63 is seated in flow port 58, and is connected to a valve stop 64 which is seated in a flare-shaped portion 66 of borehole 48. A semi-spherical valve actuator 68 is formed under valve stop 64, and a valve stem 70 extends therefrom and externally at an end of housing 44. Ball-check valve 63 is spring-loaded in flow port 58 under spring 72, preventing beverage flow via port 58 since it is normally closed.

A pin 74 is mounted in solid portion 46 of housing 44 and is loaded against compression spring 76. Formed at one end of pin 74 is a button 78, and the other end 80 of pin 74 extends into borehole 48 and is cut at an angle, with the angled portion resting under semi-spherical valve actuator 68. Reciprocating horizontal movement of pin 74 lifts and lowers valve actuator 68.

An air tube 81 communicating with atmospheric air extends through solid portion 46 of housing 44 into bottle 16, allowing replacement air flow as bottle 16 contents are emptied.

In accordance with the present invention, beverage dispenser device 12 can be operated by applying slight pressure to lever 18 in either of the upper or lower positions thereof. When pressure is applied to lever 18 in the lower position, lever 18 pivots on lug 42 and its upper end 82 raises valve stem 70 and valve actuator 68, raising ball-check valve 63 to open flow port 58, enabling beverage flow. The holes 60 in flow port 58 develop reduced flow turbulence during beverage flow through flow channel 50. When released, lever 18 lowers valve 63 to stop flow. The reduced flow turbulence provided by holes 60 reduces pressure release upon operation of flow control valve 63.

In the upper position of lever 18, applying pressure thereto causes pin 74 to move inwardly against spring 76, raising valve actuator 68 and ball-check valve 63 to open flow port 58, enabling beverage flow. When lever 18 is released, pin 74 is forced outwardly, lowering valve 63 to stop beverage flow.

Figure 6A:
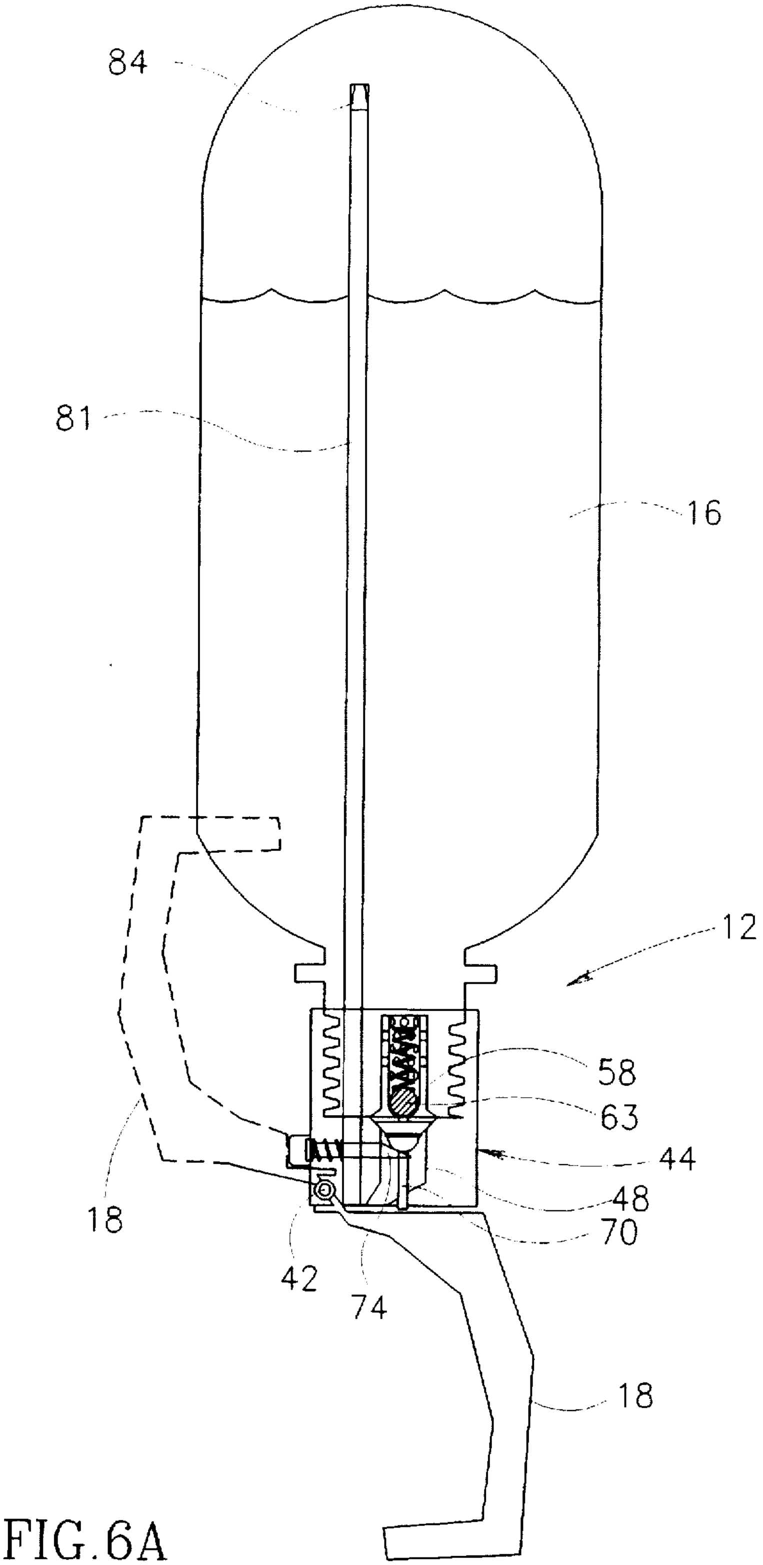
Figure 6B:
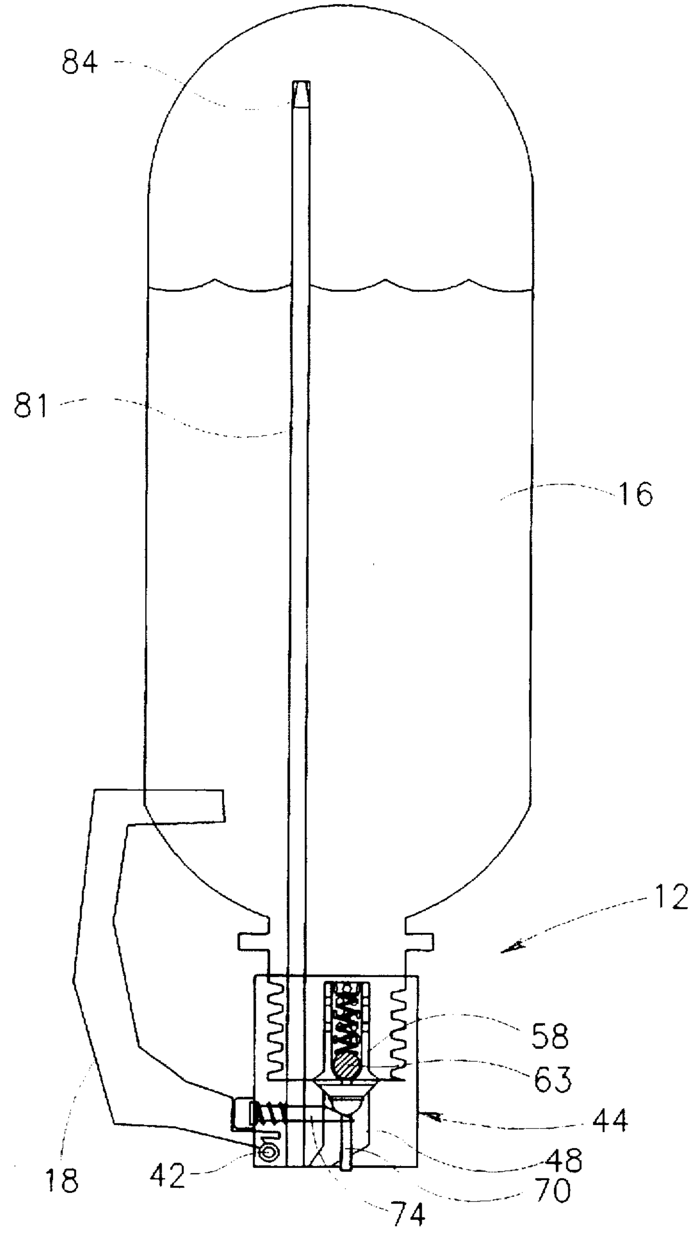

In FIGS. 6a–b, there are illustrated side views of the inventive dispenser device 12 mounted on a bottle 16 which is shown in inverted orientation. In this view, the trapped air within bottle 16 is replaced with atmospheric air via air tube 81. A one-way flow valve 84 can be applied to the end of air tube 81, to prevent drainage of liquid bottle 16 contents via air tube 81.

In FIG. 7, there is shown a cross-sectional top view of the beverage bottle 16 interior, showing the inventive beverage dispenser device 12, and revealing further construction details, including air tube 81, flow port 58, and spiral flow vanes 61 in sleeve 62.

In FIGS. 8a–b, beverage dispenser device 13 is illustrated in use, with bottle 16 inverted (FIG. 8a), and with bottle 16 in a horizontal orientation (FIG. 8b). As shown previously in FIG. 6b, when bottle 16 is inverted vertically, dispenser 12 is used by depressing a cup 85 against lever 18 in the lower position, in a one banded operation. When bottle 16 is held horizontally, lever 18 is oriented to the upper position, and pressure is applied by the hand as shown.

Thus, in accordance with the principles of the present invention, a low-cost, compact and easy-to-use beverage dispenser device is provided for use with beverage bottles in many applications, including refrigerator doors, camping equipment, or free-standing bottles.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

I claim:

1. A beverage dispenser device for controlling dual-mode beverage flow during dispensing from a bottle held in one of horizontal and inverted positions, said device comprising:

a generally cylindrical housing having a borehole formed therethrough, and having means for engaging the mouth of the bottle;

an operating lever pivotably attached to said housing and movable between upper and lower positions, said upper position being defined by said lever extending proximately alongside the bottle while held horizontally, said lower position being defined by said lever extending downwards below the bottle mouth while inverted;

a self-closing flow valve seated at an end of said borehole, for controlling beverage flow therethrough; and a valve actuator means in said housing being operable with said operating lever to open said flow valve upon application of pressure to said operating lever while it extends substantially in either of said upper and lower positions, to enable controlled dual-mode beverage flow.

2. The device of claim 1 wherein said valve actuator means is a pin extending vertically from said housing and contacting a portion of said lever when in said lower position, such that when said pressure is applied to said lever, said valve actuator pin is raised and said flow valve opens, enabling controlled beverage flow.

3. The device of claim 1 wherein said valve actuator means has a semi-spherically shaped bottom portion, under which there rests a tapered end of a rod, said rod extending horizontally in said housing and contacting a portion of said lever when in said upper position, said rod being loaded against a compression spring, such that reciprocating horizontal movement of said rod lifts and lowers said valve actuator, opening and closing said flow valve, to enable controlled beverage flow.

4. The device of claim 1 wherein said means for engaging the mouth of the bottle is a threaded opening matching bottle neck threads.

5. The device of claim 1 wherein said flow valve comprises a spring-loaded ball-check control valve seated in a cylindrical tube having holes formed therein and being surrounded by a sleeve having spiral flow vanes formed therein, said holes and spiral vanes causing reduced flow turbulence during said beverage flow.

6. The device of claim 1 further comprising an air tube communicating with atmospheric air, extending through said housing into the bottle, allowing replacement air flow therein during beverage flow.

7. The device of claim 6 further comprising a one-way valve mounted on said air tube to prevent beverage flow therein.

8. The device of claim 1 further comprising means for holding the bottle containing a beverage in inverted fashion, such that said dispenser device dispenses the beverage while the bottle remains inverted and said lever is in said lower position.

9. The device of claim 8 wherein said means for holding the bottle is an ice container for removably holding the bottle.

10. The device of claim 8 wherein said means for holding the bottle is a refrigerator door for removably holding the bottle.

11. The device of claim 8 wherein said means for holding the bottle is a table-top beverage dispenser machine for removably holding the bottle.

12. The device of claim 1 wherein said dispenser device dispenses the beverage while the bottle is held horizontally and said lever is in said upper position.

13. The device of claim 1 wherein application of pressure to said operating lever while it extends substantially in said lower position is provided in a one-handed operation by a cup held in a user's hand and depressed against it.

14. A method of controlling dual-mode beverage flow during dispensing from a bottle held in one of horizontal and inverted positions, said method comprising the steps of:

providing a generally cylindrical housing having a borehole formed therethrough, and having means for engaging the mouth of the bottle, an operating lever pivotably attached to said housing and movable between upper and lower positions, said upper position being defined by said lever extending proximately alongside the bottle while held horizontally, said lower position being defined by said lever extending downwards below the bottle mouth while inverted, a self-closing flow valve seated at an end of said borehole, for controlling beverage flow therethrough, and a valve actuator means in said housing being operable with said operating lever; and applying pressure to said operating lever while it extends substantially in either of said upper and lower positions, to open said flow valve and enable controlled dual-mode beverage flow.

15. The method of claim 14 wherein said bottle is held in an inverted orientation and said lever is in said lower position.

16. The method of claim 14 wherein said bottle is held in a horizontal orientation and said lever is in said upper position.

17. A beverage dispenser device for controlling beverage flow during dispensing from a bottle, said device comprising:

a generally cylindrical housing having a borehole formed therethrough, and having means for engaging the mouth of the bottle;

an operating lever pivotably attached to said housing and movable between upper and lower positions;

a self-closing flow valve seated at an end of said borehole, for controlling beverage flow therethrough; and a valve actuator means in said housing being operable with said operating lever to open said flow valve upon application of pressure to said operating lever while it is in either of said upper and lower positions, to enable controlled beverage flow, wherein said flow valve comprises a spring-loaded ball-check control valve seated in a cylindrical tube having holes formed therein and being surrounded by a sleeve having spiral flow vanes formed therein, said holes and spiral vanes causing reduced flow turbulence during said beverage flow.

* * * * *